March 9, 1965

K. WENZEL 3,172,155

DIE FORMING PRESS

Filed June 11, 1962

INVENTOR:
Karl WENZEL

BY

Karl F. Ross

AGENT

March 9, 1965  K. WENZEL  3,172,155
DIE FORMING PRESS
Filed June 11, 1962
2 Sheets-Sheet 2

INVENTOR:
Karl Wenzel
BY
Karl F. Ross
AGENT

United States Patent Office 3,172,155
Patented Mar. 9, 1965

3,172,155
DIE FORMING PRESS
Karl Wenzel, Ettenheim, Kreis Lahr, Germany, assignor to Maschinenfabrik Fahr A.G., Gottmadingen, Kreis Konstanz, Germany
Filed June 11, 1962, Ser. No. 201,477
Claims priority, application Germany, June 13, 1961, M 49,338; June 15, 1961, M 49,364
7 Claims. (Cl. 18—16)

My present invention relates to a press and, more particularly, to a press for the die forming of material in a plastic state.

Die forming apparatus generally comprises a pair of dies which, in their closed condition, form a mold for the casting of a flowable and hardenable material or for the shaping of plastically deformable solid and semisolid material. These presses are generally referred to as injection-molding or die casting presses and are operated either with liquid or comminuted synthetic resins, liquid metals, or thermally softenable solids (e.g. thermoplastics). A press of this type is usually provided with a piston or plunger reciprocable in a cylinder for closing the dies or mold halves. Heretofore, at least one of the dies has been provided with so-called stripper, ejection or knockout pins outwardly from the piston for ejecting a formed article from the respective die. For the most part, the mechanism required to operate these ejection elements was extremely complicated and required complex machining techniques, with consequent increase in cost, to produce suitable dies and die-carrying members. Moreover, the press was often provided with a further piston-and-cylinder or ram arrangement, particularly in injection molding apparatus, for the introduction of a flowable material into the mold formed by the die. In this case also, the ejection pins were provided along the outer regions of the die-carrying member to avoid the difficult task of disposing them in the vicinity of the piston.

It is an object of the present invention, therefore, to provide an improved knockout or stripper arrangement for presses of the character described.

This object is attained, according to the invention, by providing, in a press for the die forming of material in a plastic state, a support member or a die-carrying member with cylinder means forming at least one chamber for a compression fluid. The piston means is disposed in the cylinder means substantially symmetrically with respect to an ejection element extending substantially centrally through the die-carrying member. Consequently, if the piston-and-cylinder arrangement is to be employed for operating the die-carrying member, the piston means is operatively connected with the other or support member while control means introduces a fluid under pressure into the cylinder means for operating the piston means.

In my copending application, Ser. No. 201,478, filed concurrently herewith, I claim a particular cylinder-and-piston arrangement wherein the ejection element extends through a tubular piston. Advantageously, the cylinder means may include a plurality of fluid-pressure cylinders offset from the stripper or ejection element while the piston means includes a respective piston displaceable in each of the cylinders and having a respective axis offset from the element. The control means then comprises conduit means connecting the cylinders in parallel for the simultaneous operation of the pistons so that the latter act uniformly about the ejection pin. The cylinders and pistons are angularly equispaced about the element so that, if two such cylinders are provided, they are diametrically opposite with respect to the ejection pin centrolly located between them; if three or more cylinders are provided, they are angularly spaced by 120° etc. in accordance with the number of cylinders.

A further feature of the invention resides in the provision of a cylinder block, which serves as the aforementioned support member, formed with the cylinders and provided with abutment means engageable with an ejection element for displacing same. The cylinder block may be provided with guide means, such as rails, extending in the direction of displacement of the die-carrying member and slidably engaging it. The die-carrying member thus entrains the element along with it until the abutment means are effective to retract or actuate the element. The latter may be provided with a pair of spaced-apart stops forming a lost-motion connection with the abutment means to permit a displacement of the die-carrying member sufficient to effect removal of the formed article from the mold. A further die-carrying member, similarly provided with an ejection element or pin, may be juxtaposed with the member displaceable by the pistons while the movable member is provided with further abutment means engageable with the other element upon displacement of the die-carrying member.

By providing the pistons and cylinders outwardly of a central region of the support which is formed with a bore for the pin, an inexpensive piston-and-cylinder arrangement for a press of the character described is achieved.

The above and other objects, features and advantages of the present invention will become more readily apparent from the following description, reference being made to the accompanying drawing in which.

Figure 1:
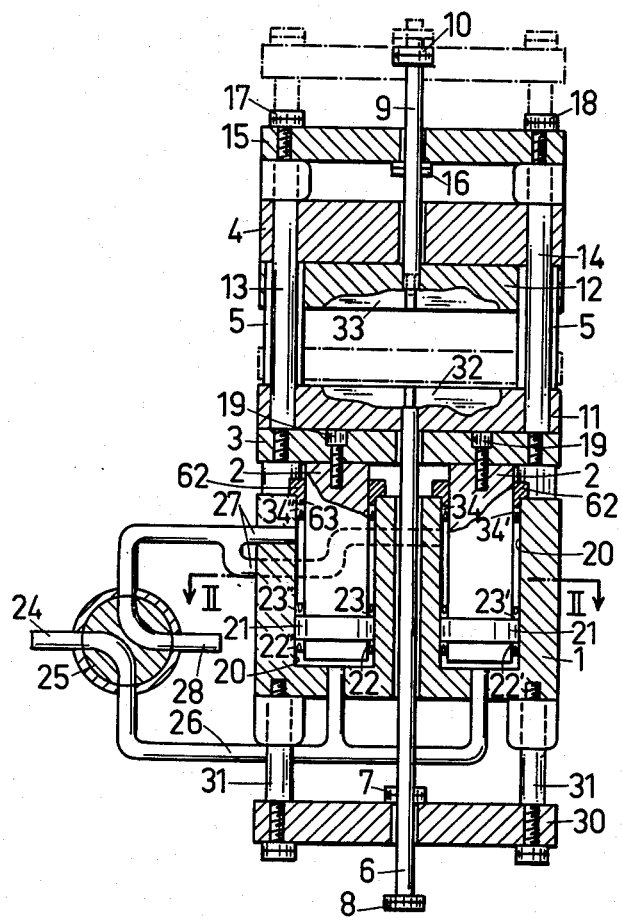
FIG. 1 is a longitudinal cross-sectional view through an upright press having a movable lower press platen or die-carrying member according to the invention.
Figure 3:
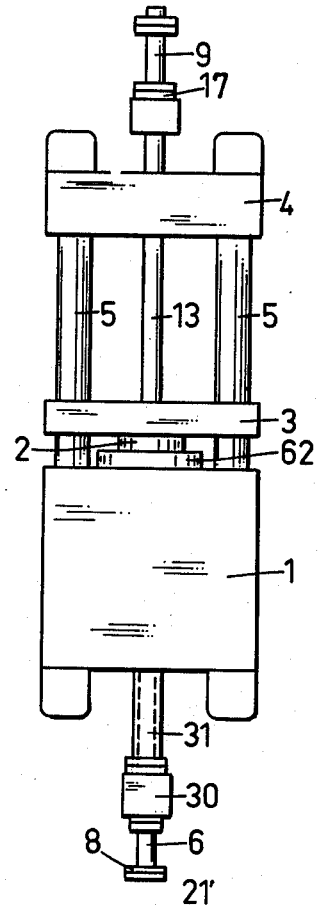
FIG. 3 is a side-elevational view of the press.
Figure 2:
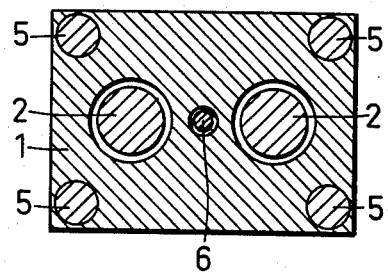
FIG. 2 is a cross-sectional view taken along the line II—II of FIG. 1.

In FIGS. 1-3 I show a press provided with a cylinder block cross-section. A lower patent or die-carrying member guide rails 5 at the corners of the generally rectangular block cross-section. A lower platen or die-carrying member 3 is vertically shiftable on the guide rails 5 and mounts a die 11 which forms, together with the complementary die 12 of a stationary platen or die-carrying member 4, a mold for the die forming of material in a plastic state. The upper die-carrying member 4 is mounted upon the rails 5 and is thus fixed relatively to the cylinder block 1. The lower die-carrying member 3 is formed with a pair of rods 13, 14 which pass slidably through the die 12 and platen 4 and are provided with a crosspiece 15 which forms abutment means for the actuation and retraction of an ejection pin 9 passing through this crosspiece and the upper platen 4. The die 12 frictionally engages the ejection pin 9 which is shown in its "eject" position and is provided with stops 10 and 16 forming a lost-motion connection with the abutment 15. Nuts 17 and 18 secured the cross-piece 15 to the rods 13, 14 against shoulder thereon.

A pair of pistons 2 are rigidly secured to the lower die-carrying member 3 by respective countersunk bolts 19 and are reciprocably displaceable within cylinders 20 formed in the block 1. The pistons 2 are provided with annular shoulders 21 which slidably engage the walls of cylinders 20 and are formed with annular seals 22, 23 along the shoulders. The seals 22 and 23 are channeled to provide flanges 22', 22", 23" bearing upon the outer peripheral wall of each piston and the inner peripheral wall of each cylinder respectively.

When fluid under pressure is admitted from a source 24 via a two-position valve 25 and a conduit 26 to the two cylinders 20 connected in parallel, below their pistons, the fluid forces the pistons upwardly to displace the platen 3 into its dot-dash position (FIG. 1). The pressure entering the channel within the cylinder rings 22 urges their flanges against the respective walls as previously mentioned. The fluid above the piston shoulders 21 is returned to the reservoir via conduits 27, valve 25 and a return tube 28.

The block 1 is also provided with an abutment 30 carried upon rods 31 threadedly received in the block. An ejection pin 6 passes centrally through the die-carrying member 3, the block 1 and the abutment 30, but is frictionally entrained by the die 11. The pistons 2 are thus disposed and are effectively symmetrically with respect to the pin 6 which carries stops 7 and 8 forming a lost-motion connection with the abutment 30.

As the die-carrying member 3 rises in response to the introduction of fluid under pressure into cylinders 20 via conduit 26, the die 11 carried thereby entrains the pin 6 upwardly until its lower stop 8 engages the abutment 30 whereupon this ejection pin is retracted out of the mold cavity 32, 33 formed by the dies 11 and 12 just prior to their closure. Prior to or upon closing of the mold a plastically deformable solid (e.g. a thermosoftening plastic) or a solidifiable liquid (e.g. liquid metal or a hardenable synthetic resin) is introduced into the mold in the usual manner. If thermoplastic synthetic resins are employed, conventional heating means are provided in the mold-halves or dies 11, 12 to render the material plastically deformable. Similar heating means, which may include bores within the dies through which a heating fluid is circulated or electrical resistance-heating elements passing through the mold, may be provided to cure thermosetting liquids injected into the mold cavity 32, 33 or to fuse comminuted material. When the dies are to be employed for the die casting of liquid metal, a cooling fluid may be circulated through these bores.

As the lower die-carrying member 3 rises, rods 13 and 14 carry the crosspiece 15 upwardly so that it engages the stop 10 of pin 9 and retracts same from the mold cavity 32, 33 just prior to closure of the dies 11 and 12. A rotation of the control valve 25 through an angle of 90° in the clockwise sense connects the source 24 of fluid with the conduits 27 of cylinders 20 while conduits 26 thereof communicate with the return tube 28. Consequently, pressure is applied to the pistons 21 in the downward direction so that these pistons are simultaneously displaced in this direction. The pressure of the fluid also urges the flanges 23′ and 23″ of the sealing ring 23 against the inner peripheral wall of each cylinder 20 and the outer peripheral wall of each piston 21, respectively. Cylinders 20 are closed at their upper ends by a pair of rings 62 having axially extending flanges 63 projecting into the cylinder and surrounding the respective piston 21. The rings 62 serve as sealing members against which annular seals 34 abut. The seals 34 are, like the seals 22 and 23 previously described, resilient and formed with respective channels subdividing the seal into an flange 34′, which bears upon the outer peripheral wall of the respective piston 21, and an outer flange 34″ bearing against the inner peripheral wall of the respective cylinder 20 upon the supplying of fluid under pressure through conduits 27.

As the die-carrying plate 3 descends under the action of the fluid, its die 11 frictionally entrains the pin 6 downwardly until the stop 7 of the latter strikes the abutment 30 whereupon the continued descent of the die results in the entry of the pin into the cavity 32 to eject the formed article therefrom. Concurrently, rods 13 and 14 carry the abutment 15 downwardly until it strikes stop 16 of the upper ejection pin 9 to displace this pin into the mold cavity 33 so as to dislodge any article which may have been held therein. The apparatus will then be in the solid-line position shown in FIG. 1. A rotation of valve 25 counterclockwise will repeat the sequence of operations. It will be immediately apparent that the apparatus described is particularly suitable for automatic or semiautomatic operation inasmuch as the pins 6 and 9 are positively displaced upon shifting of the die-carrying plate 3. Moreover, it should be noted that the press described may be horizontally or vertically disposed with its piston and cylinder forming a connection between the upper platen and its support.

Figure 4:
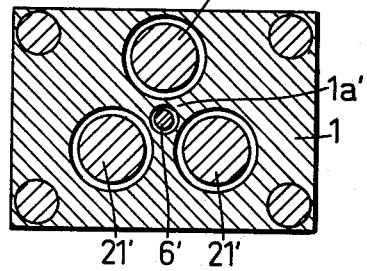
FIG. 4 is a cross-sectional view similar to FIG. 2 showing another piston arrangement according to the invention.

In FIG. 4 I show an arrangement wherein three pistons 21′ are angularly equally spaced about the centrally located pin 6′ within the cylinder block 1′. The pistons 21′ are spaced from each other by 120° so as to leave a central portion 1a′ of the block free to receive the pin 6′.

Figure 5:
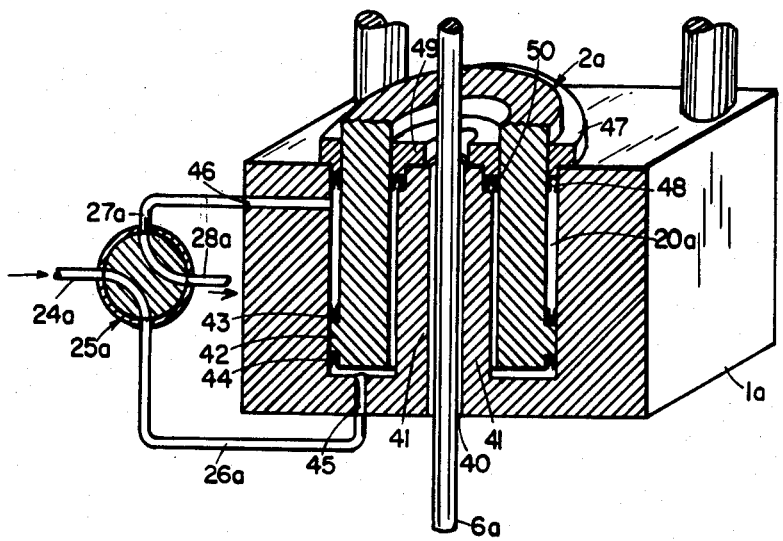
FIG. 5 is an axial cross-sectional view through a cylinder block of another embodiment of the invention.
Figure 6:
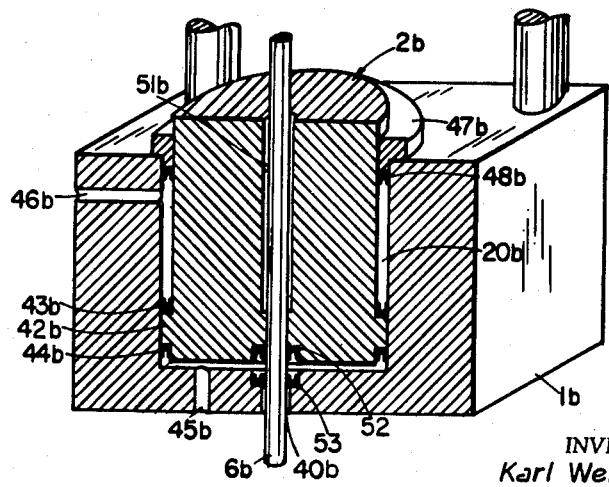
FIG. 6 is a view similar to FIG. 5 illustrating yet another embodiment of the invention.

In FIGS. 5 and 6 I show other arrangements wherein piston means is disposed symmetrically with respect to the ejection pin. In FIG. 5, the pin 6a is received in a central bore 40 of the block 1a which is formed with a cylinder 20a. Bore 40 extends coaxially within a sleeve 41, rigid with the cylinder block 1a and defining with the inner peripheral wall of cylinder 20a an annular compression chamber adapted to receive the tubular piston 2a. The latter, which may be rigid with one of the support or die-carrying members, preferably in the manner of pistons 2 previously described, is formed with an annular shoulder 42 against which rest the flanged seals 43 and 44. The flanges of these seals bear, respectively, upon the inner peripheral wall of the cylinder 20a and the outer peripheral wall of the piston 2a.

Hydraulic fluid is supplied to the cylinder 20a from a pressure line 24a via valve 25a and a conduit 26a which leads to a passage 45 in the block 1a. Another passage 46 opens into another conduit 27a communicating with the valve 25a whose return line 28a leads to the fluid reservoir. With the valve 25a in the position shown, the hydraulic fluid is introduced into the compression chamber below the shoulder 42 to close the dies, the ejection pin and cylinder block being formed with stops and abutments as previously described. The dies are opened when the valve 25a is rotated clockwise by about 90°. The cylinder 20a is closed by a flanged outer sealing ring 47 against whose flange extending into the cylinder a seal 48 abuts. An inner sealing ring 49 and seal 50 are provided inwardly of the tubular piston 2a.

In FIG. 6 I show an arrangement wherein a bore 40b in the cylinder block 1b is aligned and of essentially the same diameter as a bore 51b in the tubular piston 2b which is reciprocable within the cylinder 20b. A pair of ring seals 52, 53 are provided in the bores of the piston and cylinder block, respectively, to prevent the escape of fluid around the ejection pin 6b. Piston 2b is formed with a shoulder 42b against which rest the seals 43b, 44b as previously described. A flange ring 47b and a seal 48b surround the piston 2b and close the cylinder 20b which receives fluid via passageways 45b, 46b as described with reference to the embodiment of FIG. 5.

In FIG. 6, however, the piston 2b is provided with a portion 54 in frictional contact with the ejection element 6b so that it entrains the latter along with it upon displacement.

In the event the piston-and-cylinder arrangement shown in FIGS. 5 and 6 is to be used to inject a plastic material into the mold cavity, the block 1a, for example, may be formed as the upper die-carrying member with the passage 45 connected with the mold cavity. A hydraulic fluid may then be introduced via passage 46 to displace the piston and inject a flowable material through bore 45 into the mold cavity.

The invention as described and illustrated is believed to admit of many modifications and variations within the ability of persons skilled in the art, such modifications being deemed included within the spirit and scope of the appended claims.

I claim:

1. In a press for the die forming of material in a plastic state, in combination, support means, a pair of juxtaposed die members mounted on said support means, one of said die members being shiftable along said support means relatively to a cylinder block, said cylinder block fixedly mounted on said support means, an elongated ejection element displaceably received in said cylinder block and extending therethrough into said one of said die members for ejecting a formed article therefrom, piston means operatively connected to said one of said members while being reciprocably displaceable in said cylinder block and disposed substantially symmetrically with respect to said element, said element having one extremity received in said one of said members and a second extremity extending outwardly of said block away from said one of said members, control means for introducing a fluid under pressure into said cylinder block for operating said piston means to displace said die-carrying member, and cooperating abutment means on said support means and said second extremity of said element for actuating same.

2. The combination according to claim 1 wherein said cylinder block is formed with a plurality of fluid-pressure cylinders angularly equispaced about said element, said piston means comprising a piston reciprocably displaceable in each of said cylinders and having a respective axis offset from said element, said control means comprising conduit means connecting said cylinders in parallel for the simultaneous operation of said pistons.

3. The combination according to claim 1, further comprising guide means extending on said block in the direction of displacement of said one of said die members, said one of said die members slidably engaging said guide means.

4. The combination according to claim 3 wherein said guide means includes a plurality of rails extending outwardly from said block in said direction.

5. The combination according to claim 4 wherein said abutment means includes a bar extending transversely to said rails and budging them, said element being provided with spaced apart stops on said second extremity forming a lost-motion connection with said bar.

6. The combination according to claim 5, further comprising another ejection element displaceably mounted on the other of said die members, and further abutment means coupled with said first die-carrying member for actuating said other ejection element.

7. The combination according to claim 1, wherein said piston means includes a tubular piston coaxial with said element.

References Cited by the Examiner

UNITED STATES PATENTS 1,193,507  8/16  Brown _____ 18—16
3,049,758  8/62  Drevalas _____ 18—42

FOREIGN PATENTS 870,898  2/53  Germany.

MICHAEL V. BRINDISI, *Primary Examiner.*